(12) United States Patent
Allen et al.

(10) Patent No.: US 7,467,913 B1
(45) Date of Patent: Dec. 23, 2008

(54) FAIRED TRUSS SPAR

(75) Inventors: Donald Wayne Allen, Katy, TX (US); Dean Leroy Henning, Needville, TX (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 08/970,312

(22) Filed: Nov. 14, 1997

Related U.S. Application Data

(60) Provisional application No. 60/031,270, filed on Nov. 15, 1996, provisional application No. 60/031,268, filed on Nov. 15, 1996.

(51) Int. Cl.
*B63B 35/44* (2006.01)
(52) U.S. Cl. .................. 405/224; 405/195.1
(58) Field of Classification Search ......... 405/224, 405/211, 216, 195.1; 114/243
See application file for complete search history.

(56) References Cited

U.S. PATENT DOCUMENTS

| | | | | |
|---|---|---|---|---|
| 1,408,868 | A * | 3/1922 | Dutcher .................. 114/243 X |
| 3,352,118 | A * | 11/1967 | Burkhardt .................. 405/211 |
| 3,410,096 | A * | 11/1968 | Schuh .................. 114/243 X |
| 3,611,976 | A * | 10/1971 | Hale .................. 114/243 |
| 3,717,113 | A * | 2/1973 | Wilde .................. 114/243 X |
| 4,078,605 | A * | 3/1978 | Jones .................. 405/224 X |
| 4,102,288 | A * | 7/1978 | Berry et al. .................. 114/41 |
| 4,171,674 | A * | 10/1979 | Hale .................. 114/243 |
| 4,326,312 | A * | 4/1982 | Tang .................. 405/224 X |
| 4,398,487 | A | 8/1983 | Ortloff et al. |
| 4,429,653 | A * | 2/1984 | Morgan et al. .................. 114/41 |
| 4,474,129 | A * | 10/1984 | Watkins et al. .................. 114/243 |
| 4,606,673 | A * | 8/1986 | Daniell .................. 405/195 X |
| 4,653,960 | A * | 3/1987 | Chun .................. 405/224 X |
| 4,656,959 | A | 4/1987 | Moisdon |
| 4,702,321 | A | 10/1987 | Horton |
| 4,726,314 | A * | 2/1988 | Ayers .................. 114/243 |
| 4,895,481 | A * | 1/1990 | Pepin-Lehalleur et al. .. 405/224 |
| 4,913,238 | A * | 4/1990 | Danazcko et al. ......... 405/195 X |
| 5,410,979 | A | 5/1995 | Allen et al. |
| 5,456,199 | A * | 10/1995 | Kernkamp .................. 114/243 X |
| 5,507,598 | A * | 4/1996 | Huete .................. 405/224 X |
| 5,558,467 | A * | 9/1996 | Horton .................. 405/224 X |
| 5,875,728 | A * | 3/1999 | Ayers et al. .................. 114/264 |
| 6,092,483 | A * | 7/2000 | Allen et al. .................. 114/264 |
| 6,179,524 | B1 * | 1/2001 | Allen et al. .................. 401/211 |
| 6,196,768 | B1 * | 3/2001 | Allen et al. .................. 405/224 |
| 6,223,672 | B1 * | 5/2001 | Allen et al. .................. 114/243 |

FOREIGN PATENT DOCUMENTS

WO  WO-9526294 A1 * 10/1995

OTHER PUBLICATIONS

OTC 4594, An Assessment of Vortex Suppression Devices for Production Risers and Towed Deep Ocean Pipe Strings, by A. C. Rogers, Southwest Research Inst., pp. 119-122, Table 1, and Figures 1-6, 1983.

(Continued)

*Primary Examiner*—David Bagnell
*Assistant Examiner*—Jong-Suk Lee

(57) ABSTRACT

A spar structure is disclosed for offshore hydrocarbon recovery operations having a vertically oriented elongated floating hull with a buoyant upper section, a ballasted lower section, and a truss member separating the floating hull from the lower ballasted section. A anchoring system connects the hull to the ocean floor and a vertically oriented fairing shaped profile section is presented on the hull.

7 Claims, 2 Drawing Sheets

OTHER PUBLICATIONS

Some Recent Studies of Vortex Shedding with Application to Marine Tubulars and Risers, by O. M. Griffin and S. E. Ramberg, Marine Technology Division, pp. 33-43, 1982.

OTC 1948, Vortex Excited Structural Oscillations of a Circular Cylinder in Steady Currents, by Roger King, BHRA Fluid Engineering, pp. 143-149, Table 1-2, Figures 1-9, 1974.

* cited by examiner

FAIRED TRUSS SPAR

RELATED APPLICATIONS

This application claims the priority to provisional application Nos. 60/031,270 and 60/031,268, each filed Nov. 15, 1996, the disclosures of which are hereby incorporated by reference.

BACKGROUND OF THE INVENTION

The present invention relates to a heave resistant, deepwater platform supporting structure known as a "spar." More particularly, the present invention relates to reducing the susceptibility of spars to vortex induced vibrations ("VIV").

Efforts to economically develop offshore oil and gas field in every deeper water create many unique engineering challenges. One of these challenges is providing a suitable surface accessible structure. Spars provide a promising answer for meeting these challenges. Spar designs provide a heave resistant, floating structure characterized by an elongated, vertically disposed hull. Most often this hull is cylindrical, buoyant at the top and with ballast at the base. The hull is anchored to the ocean floor through risers, tethers, and/or mooring lines.

Though resistant to heave, spars are not immune from the rigors of the offshore environment. The typical single column profile of the hull is particularly susceptible to VIV problems in the presence of a passing current. These currents cause vortexes to shed from the sides of the hull, inducing vibrations that can hinder normal drilling and/or production operations and lead to the failure of the anchoring members or other critical structural elements.

Helical strakes and shrouds have been used or proposed for such applications to reduce vortex induced vibrations. Strakes and shrouds can be made to be effective regardless of the orientation of the current to the marine element. But shrouds and strakes materially increase the drag on such large marine elements.

Thus, there is a clear need for a low drag. VIV reducing system suitable for deployment in protecting the hull of a truss spar type offshore structure.

SUMMARY OF THE INVENTION

Toward providing these and other advantages, the present invention is a spar structure for offshore hydrocarbon recovery operations having a vertically oriented elongated floating hull with a buoyant upper section, a ballasted lower section, and a truss member separating the floating hull from the lower ballasted section. A anchoring system connects the hull to the ocean floor and a vertically oriented fairing shaped profile section is presented on the hull.

BRIEF DESCRIPTION OF THE DRAWINGS

The brief description above, as well as further advantages of the present invention will be more fully appreciated by reference to the following detailed description of the illustrated embodiments which should be read in conjunction with the accompanying drawings in which.

DETAILED DESCRIPTION OF ILLUSTRATIVE EMBODIMENTS

Figure 1:
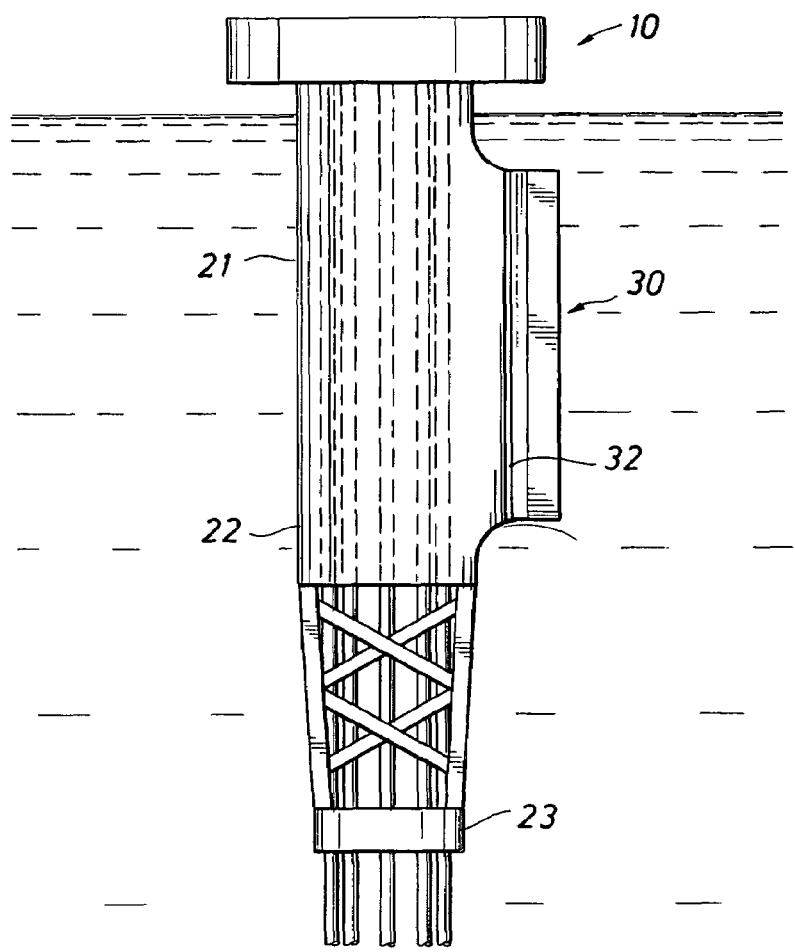
FIG. 1 is a side elevational view of a faired truss spar in accordance with an embodiment of the present invention having a fixed fairing.

FIG. 1 illustrates the environment of the present invention. Here spar 10 presents a deck 12 above ocean surface 14. Spars are a broad class of floating, moored offshore structure characterized in that they are resistant to heave motions and present an elongated, vertically oriented hull 22 which is buoyant at the top 21 and is ballasted at its base 23. A truss element 24 separates ballast 23 from hull 21. Such spars may be deployed in a variety of sizes and configuration suited to their intended purpose ranging from drilling alone, drilling and production, or production alone.

A plurality of risers 16 extend from the deck to the ocean floor at wells (not shown) to conduct well fluids. Deck 12 is supported at the top of spar hull 22. The hull is elongated and vertically oriented with a buoyant top section and a ballasted lower section. A plurality of mooring lines may be connected to a spread of anchors (see lines 25 in FIG. 2) set in the ocean floor to help hold spar 10 in place over the wells. In other embodiments, the risers may act alone as tethers to form the anchoring system securing hull 22 in place while providing conduits for conducting produced oil and gas. The upper end of risers 16 are connected to production facilities supported by deck 12 and, after initial treatment, the hydrocarbons are directed through an export riser to a sub sea pipeline, not shown.

In this embodiment, risers are arranged within a moonpool along the interior periphery of hull 22. Further, a slot 32 in the hull provides an opportunity to pass risers 16 from an auxiliary drill and completion vessel (not shown) to the moonpool with the structure.

FIG. 1 illustrates an embodiment of a productive spar, but appropriately adapted spar configurations are suitable for drilling operations or for combined drilling and production operations as well in the development of offshore hydrocarbon reserves. A basic characteristic of spar type structure is their heave resistance. However, the typical elongated, usually cylindrical hull or caisson 22 is very susceptible to vortex induced vibration ("VIV") in the presence of a passing current. These currents cause vortexes to shed from the sides of the hull 22, inducing vibrations that can hinder normal drilling and/or production operations and lead to the failure of the risers, mooring line connections or other critical structural elements. Premature fatigue failure is a particular concern.

Prior efforts at suppressing VIV in spar hulls have centered on strakes and shrouds. However both of these efforts have tended to produce structures with having high drag coefficients, rendering the hull more susceptible to drift. This commits substantial increases in the robustness required in the anchoring system. Further, this is a substantial expense for structures that may have multiple elements extending from near the surface to the ocean floor and which are typically considered for water depths in excess of half a mile or so.

Fairings can provide low drag VIV suppression for cylindrical members. However, these have been best suited for relatively small diameter elements such as offshore risers. For a number of reasons, fairings have not been thought applicable to large marine elements. One reason is the correlation of the need for effective VIV suppression to Reynolds number. The Reynolds number for a stationary cylinder within a fluid moving perpendicular to the axis of the cylinder is approximated with the following expression:

$$Re = VD/v$$

where:
Re is the Reynolds number;
V is the current velocity;
D is the outside diameter; and
v is the kinematic viscosity Thus, in a given medium, here seawater, the Reynolds number is proportional to the velocity time the diameter and the hull of a spar is several orders of magnitude greater in diameter than typical risers were fairings have been thought appropriate. Typical of prior applications are offshore production risers designed on the basis of Reynolds numbers on the orders of 50K to 100K and drilling risers at one to two million are pushing it. By contrast, spar structures would anticipate Reynolds numbers on the order of five to fifty million, and perhaps more, depending upon the size and configuration.

Further, it has been common wisdom that the well correlated vortex shedding along a cylinder exhibited at high Reynolds numbers would require that effective VIV suppression also address reducing spanwise correlation. However, conventional fairings are not the choice in applications defined with in this manner when compared with helical strakes or shrouds which disturb such correlation spanwise as a natural side effect of breaking up the correlation of transversely passing seawater. In addition, it has been the conventional wisdom that changes in attack angle of environmental current to a fixed fairing would both limit the effectiveness in vortex shedding and subject the tail of the fairing to significant rotational loads and increased drag. Thus, fairings in general and fixed fairings in particular have been thought inapplicable to solve VIV problems for spar hulls.

Figure 2:
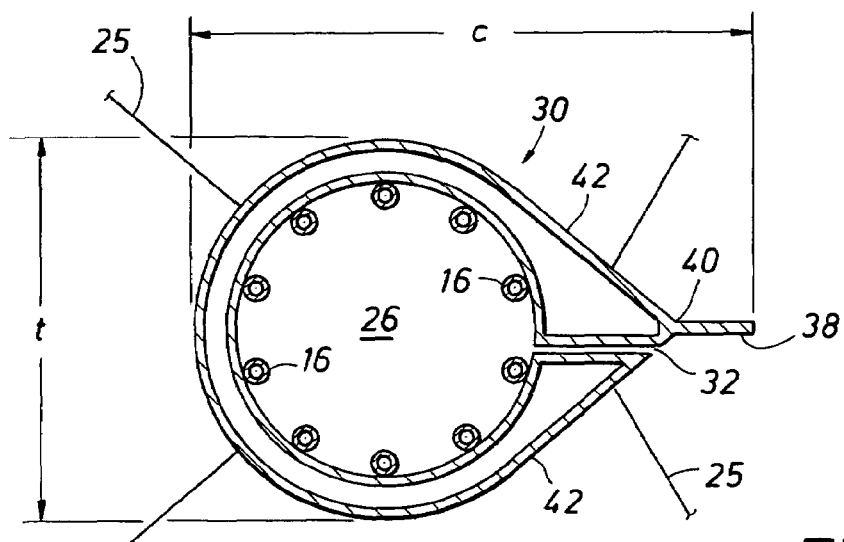
FIG. 2 is a cross sectional view of a faired truss spar in accordance with the embodiment of FIG. 1, taken at line 1-1 in FIG. 1.

However, a spar in accordance with the present invention provides a vertically oriented, fixed fairing shaped profile section 30 presented on the hull. In the embodiment of FIGS. 1 and 2, this is provided by the shape of the outer wall of hull 22 itself. The fairing shaped profile section need not necessarily extend all the way the surface, nor necessarily to the bottom of the hull. Further the fairing shaped profile may have multiple orientations FIG. 2 illustrates the important chord "c" and thickness "t" dimension of the fairing shaped profile. In this embodiment, fairing shaped profile 30 formed by hull 22 is provided with a tail section 38 which is essentially a plate extending the trailing edge of the fairing shaped profile section beyond the terminus 40 of the angled converging sides 42. Adding tail 38 extends the cord length c with a minimum of materials.

Further, any detriments in an asymmetrical arranged mass, effective mass, or even buoyancy is be minimized with a either a short fairing or an ultrashort fairing in combination with base ballast. "Short fairings," as used herein, are defined as having a chord to thickness radio between about 1.50 and 1.20 and "ultra-short fairings" are those between about 1.20 and 1.10. The surprising effectiveness of such short and ultrashort fairings has recently been demonstrated in stark contrast to the conventional wisdom requiring a much greater ratio. Short fairings are disclosed in U.S. Pat. No. 5,410,979, the disclosure thereof being hereby incorporated by reference. Ultrashort fairings are disclosed in the contemporaneously filed U.S. provisional patent application 60/031,271 by D. W. Allen and D. L. Henning for Ultrashort Fairings for Suppressing Vortex-Induced-Vibration. The disclosure of this later document is also hereby incorporated by reference.

The fixed fairing shaped profile of FIGS. 1 and 2 is is oriented on deployment to align with the prevailing current gradient alpha and can be effective for short fairings at angles of attack up to about 52.5 degrees on either side of the nominal current orientation. Further, ultrashort fairings can expand this range significantly without losing effective VIV suppression and while retaining net drag reduction at high Reynolds numbers. Brief periods somewhat outside of these ranges may be tolerable if VIV problems response to the current is primarily an issue of fatigue failure which itself is a function of time, the majority of which will find spar 10 in an effective orientation. Alternatively, the orientation can be altered to rotate spar 10 to a new orientation by using playing out and taking in asymmetrical mooring lines 24.

Note, also that the fixed fairing configuration of FIG. 1 can also be deployed in a spar hull having a plurality of fairing shaped profile sections which are arranged across a distribution of orientations, each on a different level. Such multiple fixed fairing arrangements are disclosed in further detail in the contemporaneously filed U.S. provisional patent 60/031, 271 by D. W. Allen and D. L. Henning for Staggered fairing system for Suppressing Vortex-Induced-Vibration, the disclosure of which is hereby incorporated by reference.

Figure 3:
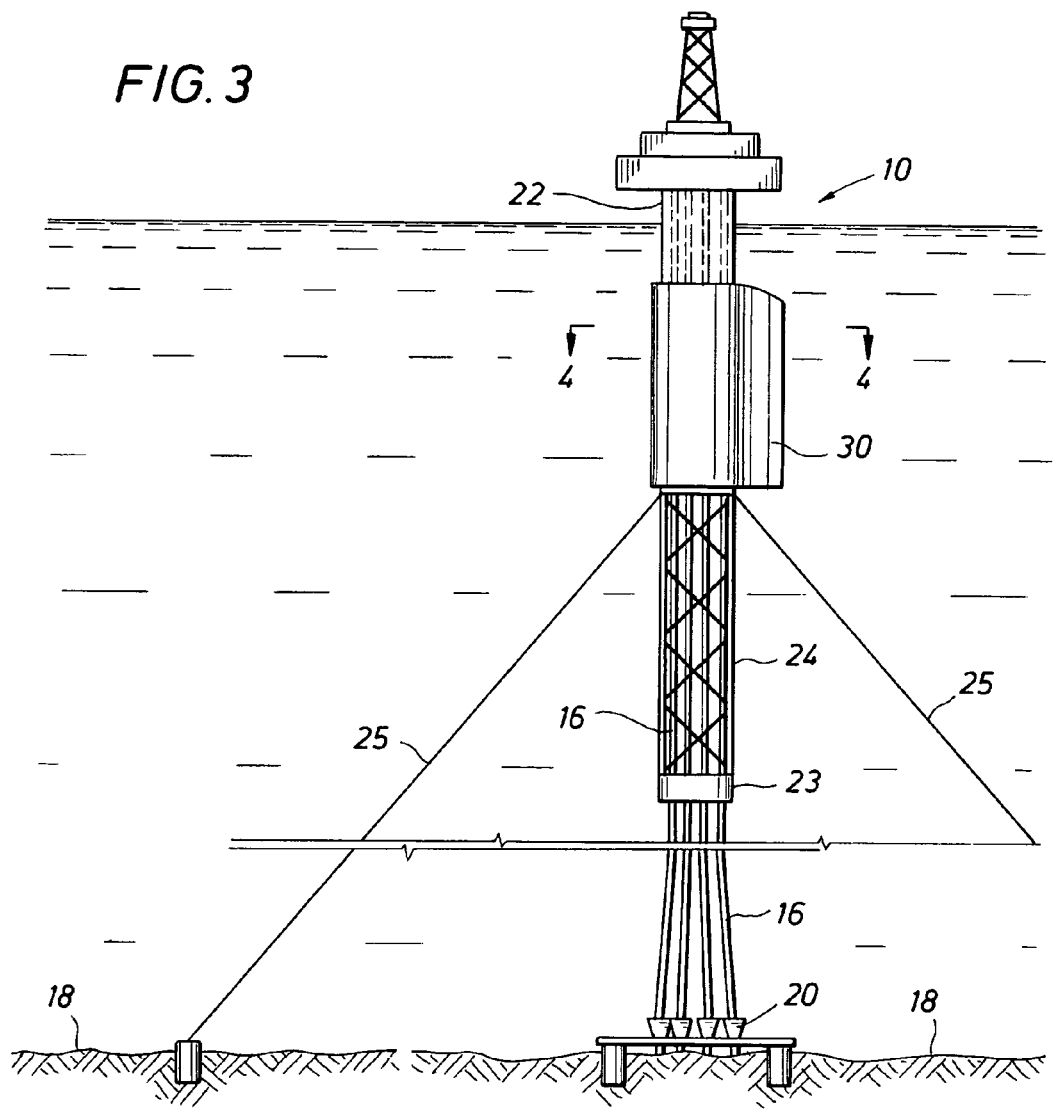
FIG. 3 is a side elevational view of a faired spar in accordance with another embodiment of the present invention.
Figure 4:
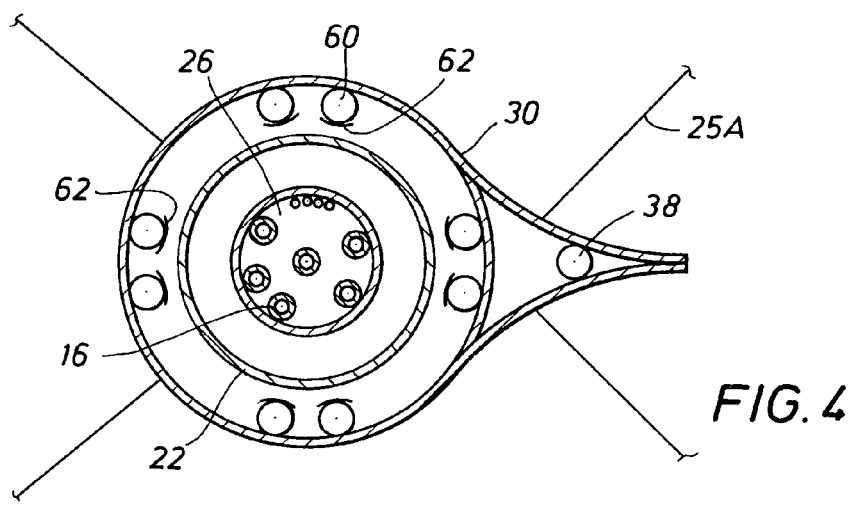
FIG. 4 is a cross sectional view of the faired spar of FIG. 3, taken at line 4-4 of FIG. 3.

The drilling and production spar of FIGS. 3 and 4 illustrates a truss spar having a freely rotatably fairing 30. Here a central moon pool 26 is provided within hull 22. In this embodiment, all the risers are run through the moon pool with the production risers mounted peripherally as they are completed, as are any export risers tying production to a pipeline system, not shown. Drilling and/or work overs proceed through a central drilling riser.

This spar configuration provides a relatively smooth exterior for hull 22 without import or export risers that need to be protected from contact with fairing 30. This permits buoyancy cans 60 to be mounted within the interior of the fairing. Preferably the buoyancy cans are provided with a low friction bearing surface or bushing 62 inboard, toward the spar hull. If a net buoyant force is provided to submerged fairing 30, a downwardly facing thrust or load collar may be mounted on the hull to act as a stop for the fairing and as a bushing surface for its rotation. Here lateral mooring lines 25 are illustrated connected to spar hull 22 below fairing 30.

An optional alternative set of mooring lines 25A are illustrated in dotted outline in FIG. 4. These attach directly to fairing 30 in an asymmetrical manner. These fairings provide a spring response to reorientation of the fairing. Where substantial rotation is desired, the mooring lines may be played out and taken in to accommodate this rotation. This provides a hybrid response, a "soft fixed" fairing that may be allowed to rotate without transmitting the rotation to the spar hull and thereby causing the risers to twist relative to their securement at well heads 20 at ocean floor 18.

The fairings of the present invention can be used with other VIV suppression and drag reduction facilities on the risers, mooring lines, or on the spar hull. For instance, fixed fairings may be provided on portions of the hull with intermediary fairings which are allowed to rotate freely.

Other modifications, changes and substitutions are intended in the foregoing disclosure and in some instances some features of the invention will be employed without a corresponding use of other features. Accordingly, it is appropriate that the appended claims be construed broadly and in the manner consistent with the spirit and scope of the invention herein.

What is claimed is:

1. In a spar structure for offshore hydrocarbon recovery operations, the spar structure comprising:
   a vertically oriented elongated floating hull having a buoyant upper section;
   a ballasted lower section;
   a truss member separating the floating hull from the lower ballasted section;
   an anchoring system connecting the floating hull to the ocean floor; and
   a vertically oriented fairing shaped profile section presented on the hull for reducing vortex induced vibrations.

2. A spar structure in accordance with claim 1 wherein the fairing shaped profile section is formed by an outer wall of the hull.

3. A spar structure in accordance with claim 2 wherein the fairing shaped profile section has a chord to thickness ratio between about 1.50 and 1.20.

4. A spar structure in accordance with claim 2 wherein the fairing shaped profile section has a chord to thickness ratio between about 1.20 and 1.10.

5. A spar structure in accordance with claim 1, wherein the fairing shaped profile section comprises a vertically extending fairing rotatably mounted about the floating hull.

6. A spar structure in accordance with claim 5 wherein the fairing shaped profile section has a chord to thickness ratio between about 1.50 and 1.20.

7. A spar structure in accordance with claim 5 wherein the fairing shaped profile section has a chord to thickness ratio between about 1.20 and 1.10.

* * * * *